(12) United States Patent
Bartoli et al.

(10) Patent No.: US 10,011,421 B2
(45) Date of Patent: Jul. 3, 2018

(54) CAPSULES AND DISPENSING MACHINE

(75) Inventors: Andrea Bartoli, Reggio Emilia (IT);
Davide Capitini, Reggio Emilia (IT);
Federica Barbieri, Villarotta di Luzzara (IT)

(73) Assignee: Sarong Societa' per Azioni (IT)

( * ) Notice: Subject to any disclaimer, the term of this patent is extended or adjusted under 35 U.S.C. 154(b) by 1344 days.

(21) Appl. No.: 13/982,897

(22) PCT Filed: Jan. 27, 2012

(86) PCT No.: PCT/IB2012/050391
§ 371 (c)(1),
(2), (4) Date: Oct. 16, 2013

(87) PCT Pub. No.: WO2012/104760
PCT Pub. Date: Aug. 9, 2012

(65) Prior Publication Data
US 2014/0026761 A1  Jan. 30, 2014

(30) Foreign Application Priority Data

Jan. 31, 2011 (IT) .............................. BO2011A0039
Jan. 31, 2011 (IT) .............................. BO2011A0040
(Continued)

(51) Int. Cl.
*A47J 31/00* (2006.01)
*B65D 85/804* (2006.01)
(Continued)

(52) U.S. Cl.
CPC ...... *B65D 85/8043* (2013.01); *A47J 31/0668* (2013.01); *A47J 31/0673* (2013.01);
(Continued)

(58) Field of Classification Search
CPC ...... A47J 31/36; A47J 31/3676; A47J 31/368; A47J 31/3685; B65D 85/8043; B65D 85/804; B65D 85/816
(Continued)

(56) References Cited

U.S. PATENT DOCUMENTS 4,077,551 A    3/1978   Manaresi
6,740,345 B2 *  5/2004   Cai .................. A47J 31/14
                                             426/112
(Continued)

FOREIGN PATENT DOCUMENTS

AU   2005227389 A1   6/2006
CN      1678511 A   10/2005
(Continued)

*Primary Examiner* — Reginald L Alexander
(74) *Attorney, Agent, or Firm* — Laubscher, Spendlove & Laubscher, P.C.

(57) ABSTRACT

A capsule includes a deformable and/or compressible casing, provided with a base wall and a side wall defining a cavity that is open and suitable for containing an initial product to obtain a final food product. A supporting element is fixed to a first edge of the casing and facing the cavity and a nozzle is fixed to the supporting element and arranged for delivering a fluid into the cavity which interacts with the initial product to make the final product. The nozzle also opens the base wall and enables the final product to exit when the casing is compressed and crushed.

41 Claims, 7 Drawing Sheets

(30) Foreign Application Priority Data

Jan. 31, 2011 (IT) .............................. BO2011A0041
Jan. 31, 2011 (IT) .............................. BO2011A0042

(51) Int. Cl.
*A47J 31/06* (2006.01)
*A47J 31/40* (2006.01)
*A47J 31/36* (2006.01)

(52) U.S. Cl.
CPC ......... *A47J 31/369* (2013.01); *A47J 31/3628* (2013.01); *A47J 31/3633* (2013.01); *A47J 31/407* (2013.01); *A47J 31/3676* (2013.01)

(58) Field of Classification Search
USPC ................................ 99/295, 323; 426/77, 80
See application file for complete search history.

(56) References Cited

U.S. PATENT DOCUMENTS

| | | | | |
|---|---|---|---|---|
| 7,335,387 | B2* | 2/2008 | Hayes | A47J 31/002 426/112 |
| 7,798,054 | B2* | 9/2010 | Evers | A47J 31/407 222/129.1 |
| 7,981,451 | B2* | 7/2011 | Ozanne | B65D 85/8043 426/79 |
| 8,501,254 | B2* | 8/2013 | Wong | A47J 31/3695 426/431 |
| 8,563,058 | B2* | 10/2013 | Roulin | B65D 85/8043 426/115 |
| 8,720,320 | B1* | 5/2014 | Rivera | A47J 31/0678 99/295 |
| 9,572,452 | B2* | 2/2017 | Rivera | A47J 31/407 |
| 2002/0148356 | A1 | 10/2002 | Lazaris | |
| 2004/0040983 | A1 | 3/2004 | Ziesel | |
| 2004/0112222 | A1 | 6/2004 | Fischer | |
| 2004/0115317 | A1* | 6/2004 | Doglioni | A47J 31/0673 426/123 |
| 2005/0112262 | A1 | 5/2005 | In Albon | |
| 2006/0174769 | A1 | 8/2006 | Favre | |
| 2006/0225575 | A1 | 10/2006 | Denisart et al. | |
| 2010/0092629 | A1 | 4/2010 | Keller | |
| 2010/0100241 | A1 | 4/2010 | Jarisch et al. | |
| 2010/0107889 | A1 | 5/2010 | Denisart | |
| 2011/0274802 | A1* | 11/2011 | Rivera | A47J 31/0668 426/431 |
| 2013/0287891 | A1* | 10/2013 | Saha | A47G 19/16 426/2 |
| 2014/0072676 | A1 | 3/2014 | Moutty | |

FOREIGN PATENT DOCUMENTS

| | | |
|---|---|---|
| CN | 1842290 A | 10/2006 |
| CN | 101594809 A | 12/2009 |
| CN | 201356446 Y | 12/2009 |
| EP | 2380471 A1 | 10/2011 |
| JP | 2005152636 A | 6/2005 |
| JP | 2006142015 A | 6/2006 |
| WO | 2007114685 A1 | 10/2007 |
| WO | 2009008723 A1 | 1/2009 |
| WO | 2009133134 A1 | 11/2009 |
| WO | 2010055465 A1 | 5/2010 |
| WO | 2010137945 A1 | 12/2010 |

* cited by examiner

CAPSULES AND DISPENSING MACHINE

This application is a § 371 National Stage Entry of PCT International Application No. PCT/IB2012/050391 filed Jan. 27, 2012. PCT/IB2012/050391 claims priority to IT Application Nos. BO2011A000039, BO2011A000040, BO2011A000041 and BO2011A000042, all filed Jan. 31, 2011. The entire contents of this application are incorporated herein by reference.

The invention relates to capsules or containers for preparing food products, typically beverages, in automatic dispensing machines, and in particular relates to a sealed, single-dose and disposable sealed capsule containing an initial product which is percolable, or soluble, or an infusion product, or freezed-dried, or dehydrated, and that is able to make a final food product by interacting with a pressurised fluid. The invention also relates to automatic dispensing machines to produce food products and, in particular, it refers to a dispensing machine for producing a final product, for example a beverage such as coffee, barley, herbal tea, tea, chocolate, etc, by injecting a fluid, typically pressurised hot water, inside a capsule containing an initial product which is percolable, or soluble, or an infusion product, or freezed-dried, or dehydrated.

Known capsules for use in known dispensing machines are disposable and single-dose containers including an external casing made of plastic material that is impermeable to liquids and gases and are glass-shaped or cup-shaped. In particular, the casing has a bottom wall and a side wall defining an upper opening through which the product can be inserted from which to obtain the beverage. The upper opening is hermetically closed by a cover, typically a film of aluminium or a film of plastics, in order to seal the product inside the container. The capsule is perforable to enable pressurised liquid to be delivered, typically water, and to enable the obtained drink to exit. In particular, the cover and the bottom wall of the casing are perforable by a suitable element of a dispensing machine into which the capsule is inserted to enable the liquid to be delivered from above and the beverage to be extracted from below, respectively.

Capsules are also known that are provided with a filtering element inserted inside the outer casing and containing the product from which to obtain the beverage.

The filter, which is shaped in such a manner as to make a cavity that is open upwards to contain the product, is fixed, in particular welded, to the side wall of the external casing at an upper peripheral side thereof. The filter divides the interior of the capsule into a first upper chamber containing the product and accessible through the upper opening of the casing (to enable filling thereof) and a second lower chamber, comprised between the filter and the bottom wall and/or side wall of the casing, that enables the beverage obtained from the product to be drawn.

Also in this case, the cover, which closes the upper opening hermetically, and the bottom wall are perforable by a suitable element of a dispensing machine to enable the liquid to be delivered and the beverage to be extracted.

A drawback of the known capsules disclosed above is that they can be used only on dispensing machines provided with a suitable dispensing circuit including an extracting device that is suitable for perforating the bottom of the capsule to enable the beverage to exit and a conduit for conveying the beverage to the consumption receptacle (for example a cup, an espresso cup, a glass, etc). This dispensing circuit makes the structure of the machine more complex and costly. Further, as it is in contact with the dispensed beverages, it should be suitably washed after each dispensing, both for hygienic reasons and in order not to compromise taste and quality (organoleptic properties) of a subsequently dispensed beverage (for example an aromatic herbal tea dispensed after a coffee). Nevertheless, a washing device of the dispensing circuit is not always present in known machines because of constructional complexity and cost.

Known dispensing machines further include a supply circuit provided with an injecting device (typically needles or pointed nozzles) that perforates the cover and delivers the pressurised liquid coming from a pump and/or from a boiler. It is observed that during the step of producing the beverage the injecting device can come into contact with the product and/or with the beverage and thus become dirtied. Like the dispensing circuit, at least the delivery device of the supply circuit should be suitably washed after each dispensing both for hygienic reasons and in order not to compromise the organoleptic properties of a subsequently dispensed beverage.

In order to overcome this drawback, capsules for beverages are provided with a first filtering element that closes the upper opening of the external casing and with a second filtering element inserted onto the bottom wall of the external casing. The filtering elements are generally made of plastics and prevent the product from exiting the capsule, but enable the pressurised liquid to pass through and the beverage to exit. With this type of capsule the extracting device is not required in the dispensing machine as the beverage exiting the capsule can be poured directly into a consumption receptacle. Further, the delivery device does not come into contact with the product or the beverage, from which it is separated by the first filtering element.

The aforesaid capsules have the drawback of being expensive because of the fact that they comprise filtering elements integrated into the external casing. Further, due to the aforesaid filtering elements, which represent respective hydraulic resistances to the passage of the liquids, the capsules require very high liquid supplying pressures and thus more complex and costly special dispensing machine.

A further drawback of said capsules resides in the fact that, as they do not close the product hermetically due to the filtering elements, for hygienic reasons and to conserve the product, they have to be suitably packaged in sealed bags, preferably in a controlled atmosphere, with a consequent further increase of production costs.

The known capsules disclosed above enable beverages to be obtained by percolation of the liquid through the product (typically coffee) or by solubilisation of the product (for example tea, herbal teas, etc). In the latter case, the product has to be easily and rapidly soluble in such a manner as to avoid the formation of coagulated matter or lumps inside the capsule and/or in the consumption receptacle. Due to the speed and manner of dispensing of the liquid inside the capsule, it is in fact almost impossible to dissolve properly products that are difficult to dissolve or slowly soluble and/or which contain thickeners to obtain dense full-bodied beverages in the consumption receptacle (typically chocolate) or viscous beverages.

As is known, such beverages can be made from a powder product only manually by gradually adding the liquid and mixing the mixture continuously until the final beverage is obtained. An object of the present invention is to improve known capsules for food products, in particular sealed, disposable and single-dose capsules containing an initial product which is percolable, or soluble, or an infusion product, or freezed-dried, or dehydrated, that is suitable for interacting with a fluid, typically pressurised hot water, to prepare a corresponding final food product, for example a beverage, in an automatic dispensing machine.

Another object is to make a capsule for beverages that is hermetic and sealed, of perforable type and able to dispense a final product directly into a consumption receptacle (cup, glass, bowl, etc).

A further object is to obtain a capsule that enables parts of the dispensing machine not to be dirtied or tainted with the final product, ensuring in this manner both the hygiene and cleanliness of the dispensing machine and the taste and the quality, i.e. the integrity of the organoleptic properties, of the final product.

Still another object is to make a capsule that enables final products such as dense and full-bodied beverages (typically chocolate) that are perfectly dissolved and devoid of coagulated matter and lumps, to be obtained automatically in a dispensing machine and without the manual intervention of a user from products that are difficult to dissolve or slowly soluble and/or contain thickeners and/or stabilisers or from freezed-dried or dehydrated products.

Another further object is to make a capsule provided with an internal filtering element that permits optimum infusion of the initial product to produce a beverage.

A still further object is to obtain a capsule provided with an internal filtering element that permits optimum flow and optimum percolation of the fluid through the initial product to produce the final product.

Still another object of the present invention is to improve dispensing machines for food products such as beverages, in particular the dispensing machines arranged for using disposable and single-dose capsules containing an initial product that is percolable, or soluble, or an infusion product, or freezed-dried or dehydrated.

Another object is to make a dispensing machine that is able to receive and use a plurality of capsules having different sizes and/or initial products to make respective final products automatically.

A further object is to obtain a dispensing machine that ensures the hygiene and cleanliness of the dispensing process by maintaining the integrity of the organoleptic properties of the final product.

Still another object is to make a dispensing machine that enables final products to be prepared and dispensed, such as beverages (typically chocolate), that are dense and full-bodied, perfectly dissolved and devoid of coagulated matter and lumps, which are obtained from initial products that are difficult to dissolve or slowly soluble and/or contain thickeners or freezed-dried or dehydrated products.

In a first aspect of the invention there is provided a capsule according to claim 1.

In a second aspect of the invention there is provided a capsule according to claim 14.

In a third aspect of the invention there is provided a capsule according to claim 26.

In a fourth aspect of the invention a dispensing machine is provided for producing a final food product according to claim 35.

The invention can be better understood and implemented with reference to the attached drawings that illustrate some embodiments thereof by way of non-limiting example, in which.

Figure 1:
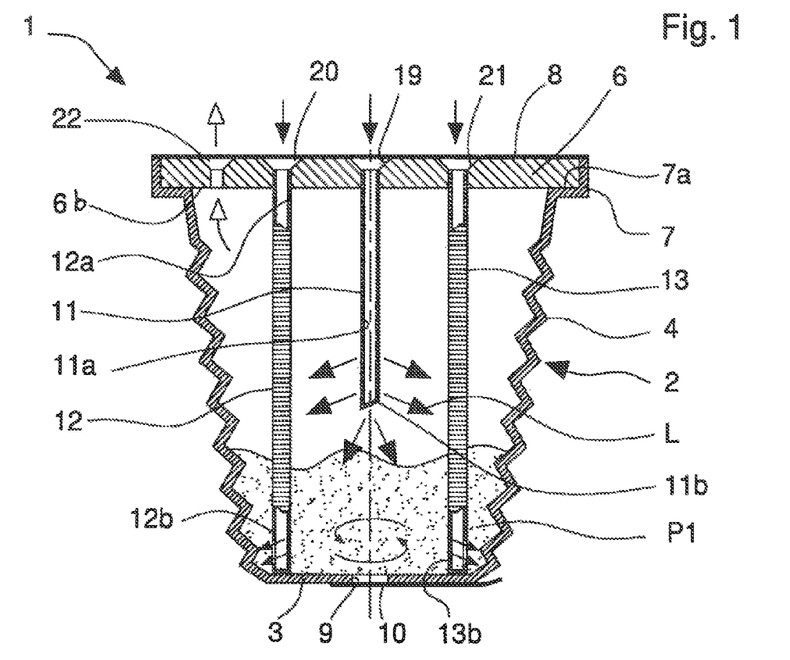
FIG. 1 is a schematic cross section of a capsule according to the invention.
Figure 2:
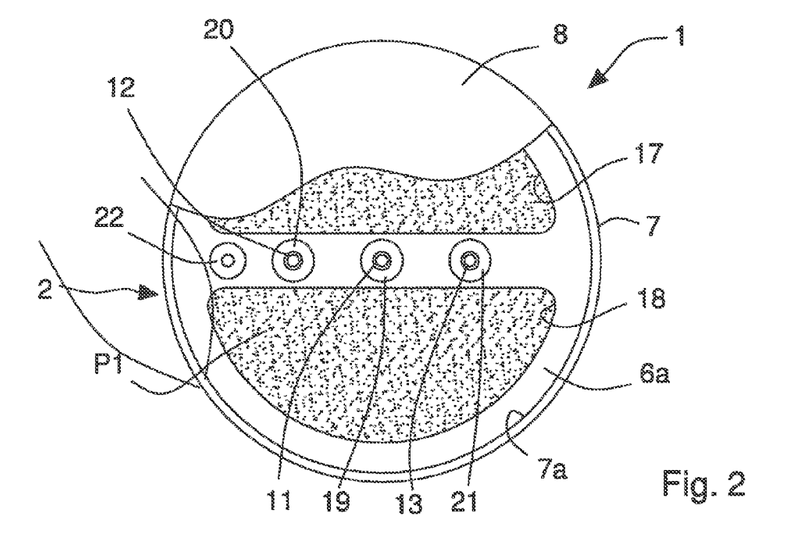
FIG. 2 is a top plan view of the capsule in FIG. 1, with a covering element that is partially removed to show an underlying supporting element.
Figure 3:
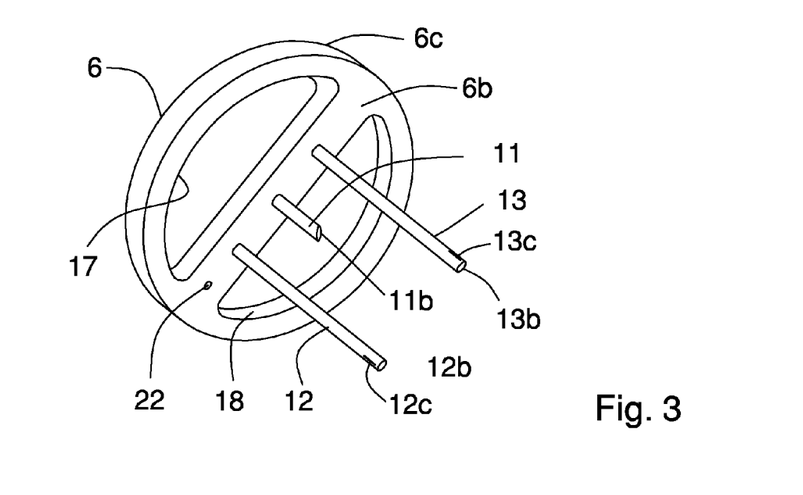
FIG. 3 is a perspective view of the supporting element in FIG. 1.

With reference to FIGS. 1 to 3, the capsule 1 according to the invention is illustrated that is usable in a dispensing machine 60, disclosed below, for producing, by injecting a pressurised fluid inside the capsule, a final food product, for example a beverage such as coffee, barley, herbal tea, tea, chocolate, etc, or a fluid food such as soup, broth, liquidised vegetables, homogenised foods, etc.

The capsule 1 of the invention in fact comprises an external casing 2, or container, substantially in the shape of a glass or cup, provided with a base wall 3 and with a first side wall 4 defining a cavity 5 that is open and suitable for containing an initial product P1 from which to obtain a final food product B1. The initial product P1 is a product which is percolable, or soluble, or an infusion product, or freezed-dried or dehydrated.

The capsule of the invention is further suitable for containing an initial product to be combined with a fluid to make a final product which may also not be a food product, for example a pharmaceutical or phytosanitary product, a cosmetic or a detergent or generally a chemical product. Henceforth in the description, "final product" will refer, by way of non-limiting example, to a beverage.

The casing 2 is compressible and crushable, made by forming a thermoformable sheet material, in particular a multilayered material made of plastics that is impermeable to liquids and to gases and is suitable for contact with the foodstuffs.

The capsule 1 further comprises a supporting element 6 fixed to a first edge 7 of the casing 2 and facing the cavity 5. To the supporting element 6 a nozzle 11 is fixed that is arranged for delivering into the cavity 5 a fluid L, in particular a hot pressurised liquid, for example water or milk, which interacts with the initial product P1 to make the beverage B1, in a first preparatory operating step F1 of the latter.

The nozzle 11 is further set up to open, in particular perforate, the base wall 3 of the casing 2 and to enable the beverage B1 to exit the capsule 1, in a second operating step F2 in which the aforesaid casing is progressively compressed and/or crushed to reduce a volume of said casing, and thus of said capsule (in particular by moving the base wall 2 towards the supporting element 6 or the first edge 7), and making the beverage exit. For this purpose, the nozzle 11 comprises a stiff tubular element, made for example of plastics, provided with a pointed end 11b that is able to perforate the base wall 3.

The base wall 3 comprises an opening promoting device 9, 10 arranged for interacting and cooperating with the nozzle 11 to make the opening for the beverage B1 to exit. In the illustrated embodiment, the opening promoting device comprises an exit hole 9 closed hermetically by a closing element 10 that is fixed outside the base wall 3 and is perforable or detachable by the nozzle 11. The closing element 10 comprises, for example, a label made of aluminium or plastics fixed, in particular glued, to the base wall 3.

Figure 7:
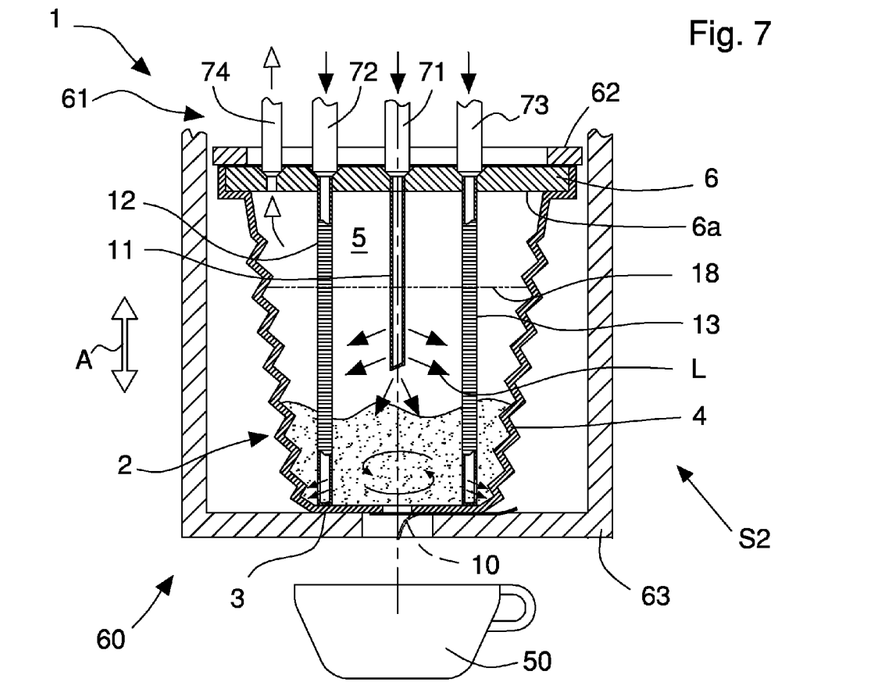
FIG. 7 is a schematic cross section of the capsule in FIG. 1 inserted into a dispensing machine and in a first operating step of injection of a pressurised liquid.

The closing element 10 can include an elongated flap that is intended to be locked by a compression device of the dispensing machine 60, in such a manner as to prevent the aforesaid closing element 10 from being completely detached and falling into a consumption receptacle underneath, during opening of the capsule 1 and dispensing of the beverage (FIG. 7).

Figures 4, 5, 6:
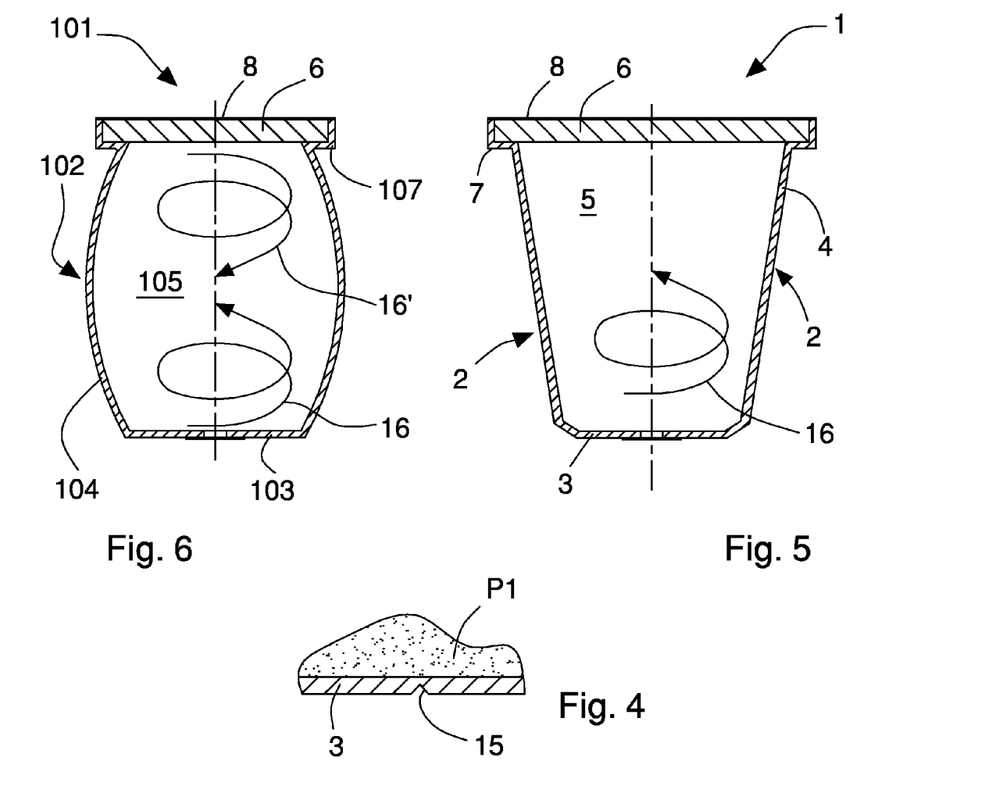
FIG. 4 illustrates an enlarged detail of a base wall of one version of the capsule in FIG. 1.
FIG. 5 is a schematic and simplified cross section of the capsule in FIG. 1 that illustrates the direction and shape of a vortical flow of fluid and initial product during production of a final product.
FIG. 6 is a schematic and simplified cross section of a version of the capsule in FIG. 1 that illustrates the direction and the shape of a vortical flow of liquid and initial product during production of the final product.

In one embodiment of the capsule 1 partially illustrated in FIG. 4, the opening promoting device comprises a pre-incision line 15 or a weakening portion made on the base wall 3 that facilitates perforation of the latter by the nozzle 11.

The weakening portion can comprise a portion with a reduced or thinned thickness of said base wall 3 that is perforable by the nozzle 11.

The capsule 1, after being opened, is further compressed and/or crushed in such a manner as to further reduce the volume thereof—in particular by moving the base wall 2 towards the supporting element 6 or the first edge 7—and enabling the beverage B1 to exit completely, in particular if the latter is dense and/or viscous. Crushing the capsule 1 in fact progressively reduces the volume also of the cavity 5 from which the beverage B1 is forced to exit.

Compressing and crushing the capsule 1 in the second operating step F2 can facilitate and cooperate with the nozzle 11 to open the capsule 1.

In one version of the capsule 1 the closing element 10 and/or the pre-incision line 15 of the base wall 3 are dimensioned and configured such that the opening (i.e. the detachment of the closing element 10 or the breakage of the wall portion at the pre-incision line 15) occurs only by virtue of the internal pressure of the beverage caused by the nozzle 11 compressing without perforating.

To enable the casing 2 to be compressed and crushed or deformed along a direction A that is transverse, in particular orthogonal, to the base wall 3, the side wall 4 is deformable and/or compressible, in particular it has an accordion-shape or bellows-shape. Further, the side wall 4 is divergent from the base wall 3 to the first edge 7, for example it has a frustoconical shape.

A covering element 8 is fixed to the first edge 7 of the casing 2 and/or to an external face 6a of the supporting element 6 for hermetically closing the capsule 1.

The first edge 7 forms an annular seat 7a that receives a peripheral edge 6c of the supporting element 6 that can be fixed there by welding or gluing, or by assembly through interference.

The capsule 1 is further provided with one or more further nozzles 12, 13, for example two, which are substantially identical to one another, which are also fixed to the supporting element 6 and arranged for delivering the fluid L into the cavity 5 in the first step F1.

In particular, the further nozzles 12, 13 are arranged substantially parallel to the nozzle 11 and alongside on opposite sides of the latter in such a manner as to move respective end portions 12b, 13b towards the side wall 4. As shown by the figures, the further nozzles 12, 13 have a greater length than the nozzle 11, such as to have the respective end portions 12b, 13b inserted inside the initial product P1 and substantially in contact with the base wall 3. The further nozzles 12, 13 are shaped in such a manner as to direct respective jets of fluid L towards the side wall 4, in particular in a substantially tangential direction, in such a manner as to create a vortical flow or vortex 16 of fluid L and initial product P1, which are progressively mixed, which vortex 16 rises from the base wall 3 to the supporting element 6 (FIG. 5). For this purpose, each further nozzle 12, 13 comprises at the respective end portion 12b, 13b at least one injection opening 12c, 13c, having, for example, a cutting or longitudinal slot shape.

The nozzle 11 is on the other hand configured for directing at least one jet of fluid L downwards, i.e. in the direction of the base wall 3 and substantially to the centre of the vortical flow 16 in order to push the still dry initial product P1 towards the base wall 3 and to maintain the initial product P1 on the base wall 3. In effect, the tests run have shown that as the further nozzles 12, 13 are partially inserted into the initial product P1 in an initial dispensing step, the jets of fluid L dispensed thereby tend to raise the upper portion of initial product P1 that is still dry, making the upper portion adhere to an internal face 6b of the supporting element 6 and/or to portions of the side wall 4 that are adjacent to the first edge 7.

The pressure and flow of the fluid dispensed by the nozzle 11 can be different, in particular greater, than the pressure and the flow rate of fluid dispensed by the further nozzles 12, 13.

In the embodiment illustrated in FIGS. 1 to 8, the nozzle 11 comprises at least one respective delivery opening made on, or near, the pointed and shaped end 11b to direct a respective jet of fluid L downwards in the direction of the base wall 3 and the centre of the vortical flow 16. In particular, the nozzle 11 comprises a central delivery opening leading onto the aforesaid pointed end 11b and a plurality of further delivery openings that are made on a side wall of said nozzle and are adjacent to said pointed end 11b.

In one version of the capsule that is not shown, the nozzle 11 comprises a plurality of delivery openings, made on a side wall of the nozzle near the supporting element 6, i.e. spaced away from the base wall 3. Such delivery openings are angularly spaced apart from one another substantially orthogonally to a longitudinal axis of the nozzle 11 or tilted downwards, for example by an angle of 45°, in such a manner as to direct a plurality of jets of fluid L to the base wall 3 and to the centre of the vortical flow 16 to push the still dry initial product P1 to the base wall 3 and to maintain the still dry initial product P1 thereupon.

It should be noted that the combination of the jets of fluid L dispensed by the nozzle 11 and by the further nozzles 12, enables products to be solubilised and dissolved completely and homogenously without the manual intervention of a user that are difficult to dissolve or slowly soluble and/or contain thickeners and stabilisers, or freezed-dried or dehydrated products, such as to obtain dense or viscous final products (for example beverages such as liquid chocolate) perfectly dissolved and devoid of coagulated matter and lumps. For this purpose, the pressure and temperature of the injected fluid have to be suitably adjusted in function of the type and composition of the initial product.

By way of example, to make a cup of liquid chocolate that is dense and devoid of lumps, the temperature of the fluid, i.e. of the water, has to be determined in function of the percentage content in particular of cocoa, powdered milk, thickeners and stabilisers. Tests conducted have shown that the temperature range to use varies between 55° C. and 80° C., in particular between 60° C. and 70° C. The injection pressure of the water through the nozzle 11 is comprised between 1.5 and 6 bar, in particular between 3.5 and 4.5 bar. The injection pressure of the water through the further nozzles 12, 13 is comprised between 1 and 4 bar, in particular between 2 and 3 bar. The quantity of water dispensed by the nozzle 11 is equal to that dispensed by both the further nozzles 12, 13 (for example a total of 100 ml for 30-35 g of powder of initial product).

In order to enable the initial product P1 to dissolve and/or solubilise completely, the cavity 5 of the capsule 1 must be filled with the necessary quantity or volume of fluid L, which is, for example, suitable for making a dose of beverage, before the opening of the base wall 3 and dispensing.

In the case of particularly dense or viscous beverages, the beverages exit from the capsule 1 by means of progressive compressing and crushing of the casing 1 in the second operating step F2.

Figure 8:
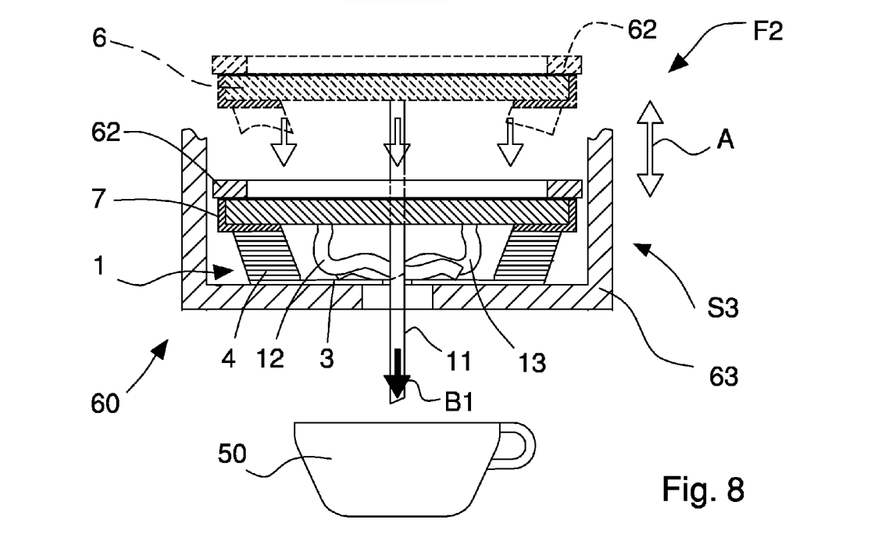
FIG. 8 is a schematic cross section of the capsule and of the dispensing machine in a second operating step.

In order to enable the capsule 1 to be compressed and/or crushed, the further nozzles 12, 13, unlike the nozzle 11, are deformable and/or compressible. In particular, each further nozzle 12, 13 comprises a corrugated or bellows-shaped tubular wall that can be easily compressed and/or folded and deformed, as illustrated in FIG. 8.

The nozzle 11 has a length that is calculated in function of the volume occupied at the end of the first operating step F1 by the mixed and solubilised beverage B1, before the bottom wall 3 is opened (in FIG. 7 reference 18 indicates the level reached by the beverage B1 after the fluid L has been introduced). The length of the nozzle 11 is such as to perforate the bottom wall 3 before the residual volume of the cavity 5, with the partially crushed capsule 1 is lower than the volume of the beverage B1, to avoid the beverage B1 being able to exit the capsule, for example by rising up from the nozzles 11, 12, 13 or from a vent provided on the supporting element 6.

The supporting element 6 comprises a body having a substantially flat shape, for example a disc, and provided with one or more openings 17, 18, for example two, to introduce the initial product P1 into the cavity 5 of the capsule 1 in a filling step of the latter.

The nozzle 11 is fixed to an internal face 6b of the supporting element 6, whereas on an opposite external face 6a of the latter a supplying hole 19 is provided that is flowingly connected to an internal conduit 11a of said nozzle 11. Similarly, the further nozzles 12, 13 are fixed to the internal face 6b, on the opposite external face 6a respective further supplying holes 20, 21 being provided that are flowingly connected to further internal conduits 12a, 13a of the respective further nozzles 12, 13.

A vent hole 22 can be provided on the supporting element 6 to permit the necessary venting during the operating step F1 of the air contained in the capsule 1 that is sealed together with the initial product P.

The supporting element 6 and the nozzles 11, 12, 13 can be made as a single body, for example by injection moulding of plastics.

The supplying holes 19, 20, 21 of the supporting element 6 are arranged for engaging with an injecting device 61 of a dispensing machine 60 (FIG. 7). The injecting device 61 comprises a plurality of needles 71, 72, 73 or similar elements arranged for perforating the covering element 8 and being inserted and sealingly abutting on the respective supplying holes 19, 20, 21, such as to deliver fluid L into the cavity 5 through the nozzles 11, 12, 13. In particular, the injecting device 61 comprises a needle 71 that is inserted into the supplying hole 19 to inject the fluid L into the nozzle 11 and further needles 72, 73, in a number that is the same as the number of further nozzles 12, 13 that are inserted into the respective further supplying holes 20, 21 to inject the fluid L into the aforesaid further nozzles 12, 13.

The injecting device 61 can also include a further needle 74 arranged for perforating the covering element 8 and being inserted and sealingly abutting on the vent hole 22 of the supporting element 6 in such a manner as to enable the air to exit the capsule 1.

It should be noted that in this manner the injecting device 61 of the dispensing machine 60 does not come into contact with the initial product P1 and/or with the mixture/beverage during the preparation step and subsequently during the dispensing step. In other words, a supply circuit of the machine that includes the injecting device 61 is not dirtied or tainted with the initial product and/or the beverage, this ensuring the hygiene of the dispensing process and the quality of the beverages at each dispensing, preserving the organoelptic properties thereof.

Similarly, it should be noted that the capsule 1 for beverages of the invention can be used on a dispensing machine 60 that is devoid of a dispensing circuit because this capsule does not require an extracting device that is suitable for perforating the bottom thereof to enable the beverage to exit, nor a conduit for conveying the beverage to the consumption receptacle (for example a cup, an espresso cup, a glass, etc).

The absence of the dispensing circuit makes the machine simpler and cheaper and further ensures the hygiene of the dispensing process and maintenance of the quality of the beverages dispensed as contamination between successively dispensed beverages is impossible.

FIG. 6 illustrates schematically one version of the capsule 101 of the invention that differs from the embodiment that is disclosed above and shown in FIGS. 1 to 5, by the casing 102 that has a side wall 104 that is convex to the outside, i.e. divergent from the base wall 3 and thus again convergent until the first edge 107.

With this form of casing 102, it is possible to create with the nozzle 11 and the further nozzles 12, 13 a vortical flow or a vortex 16 of fluid and initial product, that are progressively mixed, that from the base wall 103 rises up towards the supporting element 6 and a further vortical flow 16' of fluid and initial product that from the supporting element 6 descends to the base wall 103. The double vortical flow 16, 16' permits more efficient and rapid mixing and solubilisation of the initial product.

In the capsule 101 in FIG. 6 the closing element is devoid of an extended flap.

Figure 9:
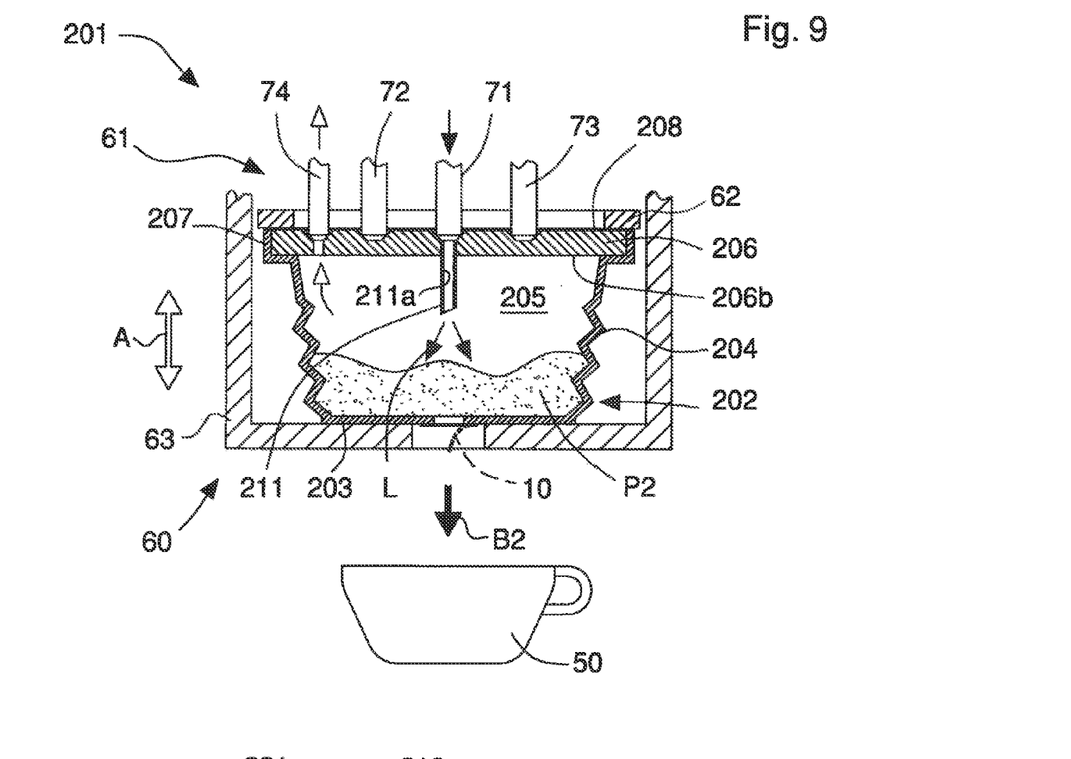
FIG. 9 is a schematic cross section of another embodiment of the capsule of the invention.

With reference to FIG. 9, there is illustrated another embodiment of the capsule 201 of the invention that is particularly suitable for making a beverage from an initial product P2 that solubilises easily and rapidly, for example soluble tea or coffee.

This capsule 201 embodiment differs from the embodiment that is illustrated above and shown in FIGS. 1 to 5 by the fact that it comprises a single nozzle 211 fixed to the supporting element 206. Further, the casing 202 is lower in height as in this case it is not necessary for the cavity 205 to be filled with the volume or quantity of liquid L necessary for making a dose of beverage, before the base wall 203 is opened. In fact, by virtue of the high solubility of the initial product P2, dispensing into the consumption receptacle 50 can take place at the same time as delivery of fluid L into the capsule 201. More precisely, in a first step F1, fluid L is delivered into the capsule 201 in a reduced quantity, but such as to dissolve the initial product P2 completely. Subsequently, in the second operating step F2 the capsule 201 is compressed and crushed (by a compressing device 62 of the dispensing machine 60) in the direction A, reducing the volume of the cavity 5 and enabling the nozzle 211 to perforate the base wall 203 for the exit of a beverage B2 that is very concentrated but devoid of lumps or coagulated matter. During the second operating step F2, fluid L is delivered that finishes partly inside the capsule and partially directly in the consumption receptacle 50. By further crushing the capsule 201 and further reducing the volume of the latter and thus of the cavity 5, all the concentrated beverage B1 is forced to exit the capsule. At the same time, further fluid L is dispensed by the nozzle 211 into the consumption receptacle 50 to dilute the beverage B2 until it reaches the desired concentration. The liquid L can also be dispensed by the nozzle 211 after crushing the capsule 201 has terminated.

In this manner, by using capsules of limited volume it is possible to obtain significant quantities of beverage to fill even large-size consumption receptacles.

Figure 10:
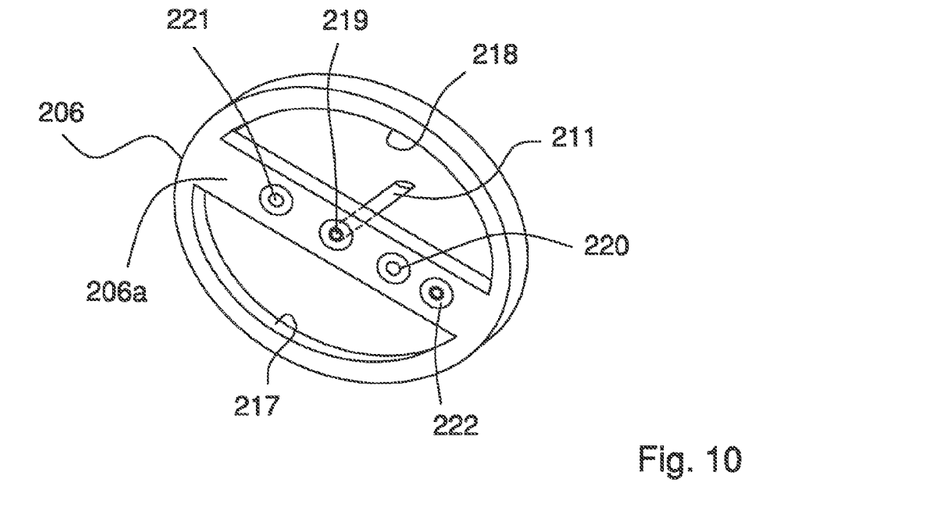
FIG. 10 is a perspective view of the supporting element of the capsule in FIG. 9.

The supporting element 206 comprises a body having a substantially flat shape, for example a disc, and being provided with one or more openings 217, 218, for example two, for introducing the initial product P2 into the cavity 205 of the capsule 201 in a filling step of the latter.

The nozzle 211 is fixed to an internal face 206b of the supporting element 6, whilst on an opposite external face 206a of the latter a supplying hole 219 is provided that is flowingly connected to an internal conduit 211a of the nozzle 11. The supplying hole is arranged for engaging with a needle 71 of the injecting device 261 of the dispensing machine 60.

Blind holes 220, 221 are further provided on the external face 206a to abut on and close the further needles 72, 73 of the injecting device 61 of the dispensing machine 60, since in this case the capsule 201 is devoid of further nozzles to be supplied.

A vent hole 222 is provided on the supporting element 206 to permit the necessary venting during the operating step F1 of the air contained in the capsule 1 that is sealed together with the initial product P2. The vent hole 222 is arranged for engaging with another further needle 74 of the injecting arrangement 61.

Figure 11:
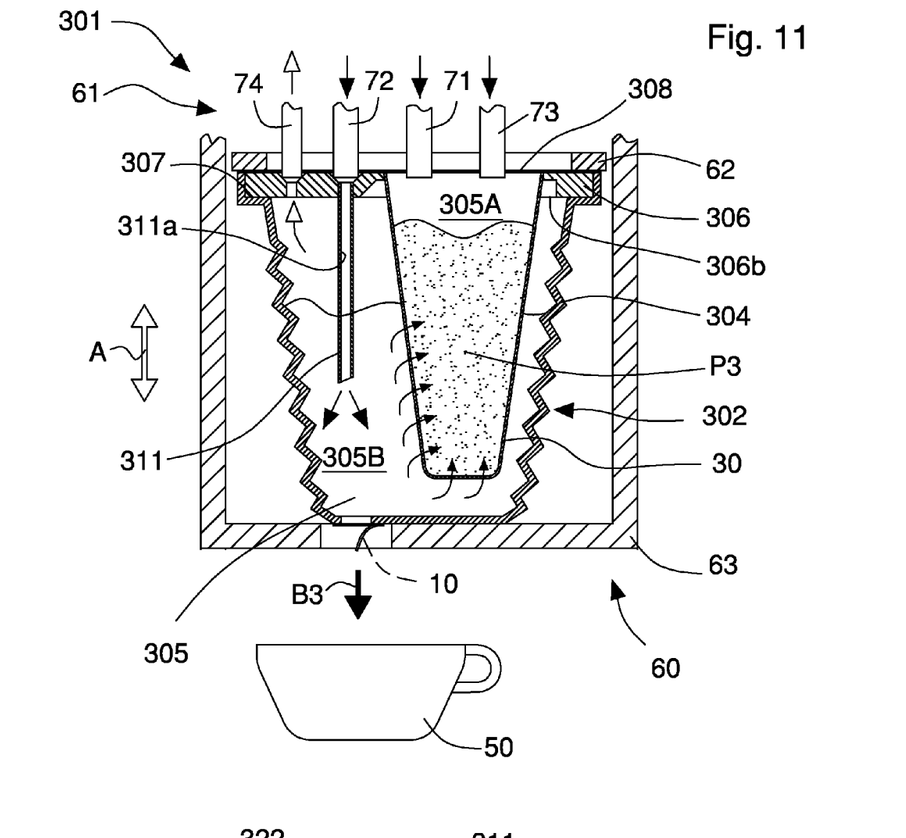
FIG. 11 is a schematic cross section of another embodiment of the capsule of the invention provided with an internal filtering element and inserted into the dispensing machine, in a first operating step of injecting a pressurised fluid.

The nozzle 311 is positioned on the supporting element 306 in such a manner as to deliver the fluid L to a second chamber 305B defined between the casing 302 and the filtering element 30. The nozzle 311 is engaged by a further needle 72 of the injecting device 61 of the dispensing machine 60.

The fluid L filters through the permeable walls of the filtering element 30 in the initial product P3. The quantity of fluid L delivered, via the nozzle 311 into the capsule 301 by the injecting device 61 of the dispensing machine 60 is approximately what is required to make a dose of beverage.

The covering element 208 is fixed to the first edge 207 of the casing 202 and to the external face 206a of the supporting element 206 for hermetically closing the capsule 201.

Figure 12:
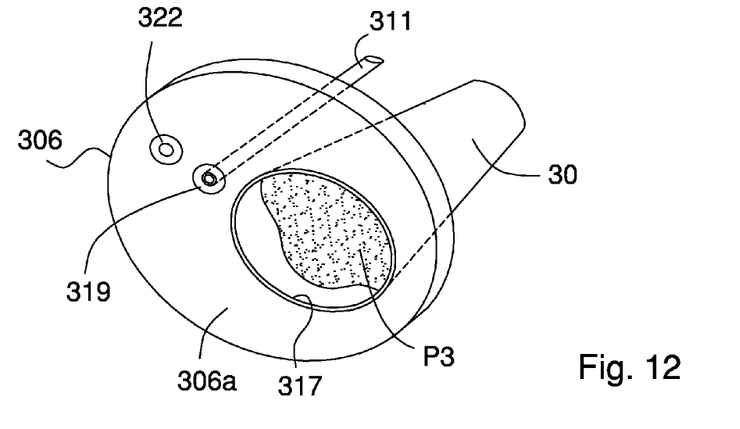
FIG. 12 is a perspective view of the supporting element and of the filtering element of the capsule in FIG. 11.

The supporting element 206 and the nozzle 211 can be made as a single body, for example by injection moulding of plastics. FIGS. 11 and 12 illustrate another embodiment of the capsule 301 for beverages of the invention that differs from the capsule 1 disclosed above and represented in FIGS. 1 to 5, by the fact that it comprises a single nozzle 311 and a filtering element 30, both fixed to the supporting element 306. The nozzle 311 is made as a single body with the supporting element 306, for example by injection moulding of plastics.

The filtering element 30 has the shape of a bag and extends from the supporting element 306 to the cavity 305 defining a first chamber 305A therein containing an initial product P3, typically an infusion product, for example coffee, tea, herbal tea, etc. The filtering element 30 is made of material that is permeable to liquids and light and soft, typically filter paper made of cellulose or polymeric material. In one version of the capsule that is not shown in the figures, the filtering element 30 is provided with a side wall comprising a plurality of longitudinal pleats or folds that are able to increase the filtering surface thereof.

In the second crushing step F2, the capsule 301 is compressed and crushed (by a compressing device 62 of the dispensing machine 60) in the direction A, reducing the volume thereof and enabling the nozzle 311 to perforate the base wall 303 to enable the beverage B3 to exit.

Optionally, the needle 71 and/or the remaining further needle 73 of the injecting arrangement 61 of the dispensing machine 60 can perforate the covering element 308 of the capsule 301 and, before the further needle 72 injects the fluid L via the nozzle 311, can inject water vapour directly onto the initial product P3, typically to prepare the initial product P3 for subsequent percolation (if the initial product is tea leaf the vapour is used to distend the latter).

After the first operating step F1 of delivering the fluid L, and before the second operating step F2 of compressing and crushing the casing 302, an intermediate infusion step follows (in which the dispensing machine 60 is on standby) that is of a duration that is such as to enable the beverage B3 to be made by infusion of the initial product P3. The duration of this step depends on the type and on the properties of the aforesaid initial product P3 (typically from 1 to 5 minutes).

The nozzle 311 is fixed to an internal face 306b of the supporting element 6, whereas on an opposite external face 306a of the latter a supplying hole 319 is provided that is flowingly connected to an internal conduit 311a of the nozzle 11. The supplying hole 319 is arranged for engaging with a further needle 72 of the injecting device 61 of the dispensing machine 60. The needle 71 and the remaining needle 73 of the injecting device 61 can be configured in such a manner as to perforate the covering element 308 and be inserted partially into the opening 317.

A vent hole 322 is provided on the supporting element 306 to permit the necessary venting during the operating step F1 of the air contained in the capsule 1 that is sealed together with the initial product P3. The vent hole 322 is arranged for engaging with another further needle 74 of the injecting device 61.

By further crushing the capsule 301 and further reducing the volume of the latter and thus of the cavity 305, all the beverage B3 is forced to exit the cavity 305. Also in this case, further fluid L can be optionally dispensed by the nozzle 311 into the consumption receptacle 50.

The supporting element 306 comprises a body having a substantially flat shape, for example a disc, and provided with an opening 317 on an edge of which an open end of the filtering element 30 is fixed. The opening 317 further enables the initial product P3 to be introduced into the filtering element 30.

Figure 13:
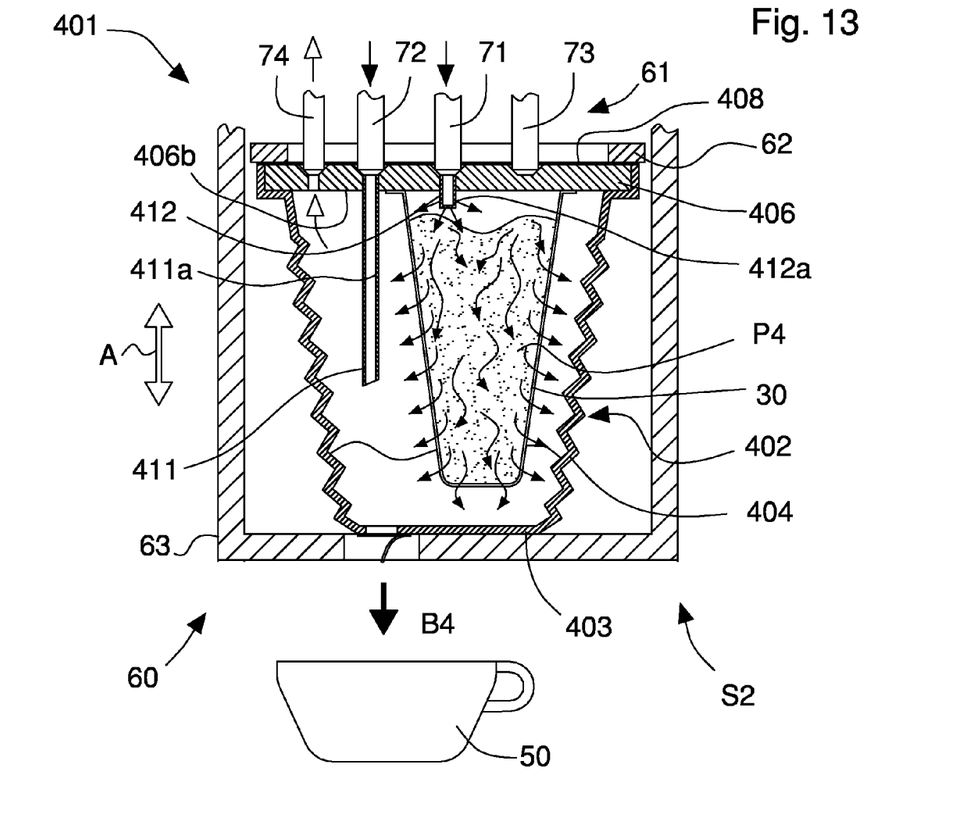
FIG. 13 is a schematic cross section of a further version of the capsule in FIG. 11 inserted into the dispensing machine and in a first operating step of injecting a pressurised fluid.

The nozzle 411 is used in the second crushing step F2 of the capsule 401 (by the compressing device 62 of the dispensing machine 60) in the direction A to perforate the base wall 403 and to enable the beverage B4 to exit into the consumption receptacle 50.

Figure 14:
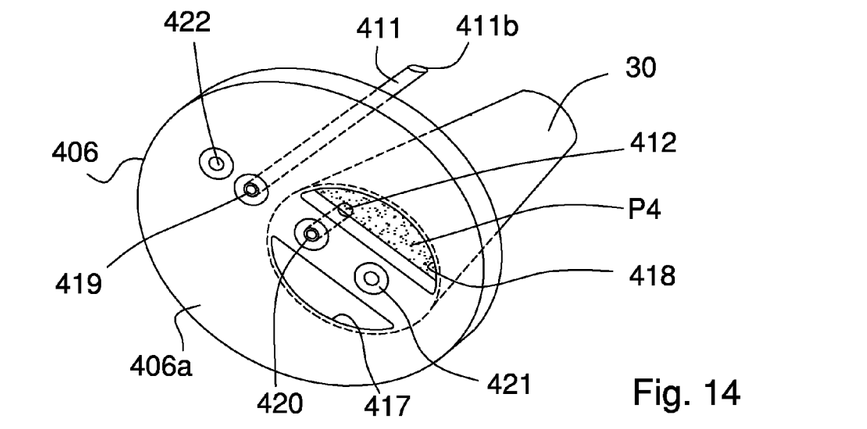
FIG. 14 is a perspective view of the supporting element and of the filtering element of the capsule in FIG. 13.

With reference to FIGS. 13 and 14, there is illustrated one version of a capsule 401 a with filtering element, that differs from the embodiment disclosed above by the fact that it comprises a nozzle 411 and a further nozzle 412 that are fixed to the supporting element 406. This version of capsule 401 is particularly suitable for obtaining a beverage B4 from an initial product P4 contained in the filtering element 30 by percolation. In this case, the fluid L is introduced in the first step F1 via the further nozzle 412, such that it can percolate through the initial product P4 and the beverage thus obtained can filter through the permeable walls of the filtering element 30 into the second chamber 405 of the cavity 404. The volume or quantity of fluid delivered, via the nozzle 412 into the capsule by the injecting device 61 of the dispensing machine 60 is approximately what is necessary to make a dose or serving of beverage.

The nozzle 411 can be optionally used in the first operating step F1 also to deliver fluid L into the cavity 405.

Also for this capsule 401, after the first operating step F1 of delivering said fluid L, and before the second operating step F2 of compressing and crushing the casing 402, an intermediate percolation step can follow (in which the dispensing machine 60 is on standby) that is of a duration that is such as to enable percolation of the fluid L through the initial product P4 to obtain the beverage B4. The duration of this step depends on the type and properties of the aforesaid initial product P4.

The nozzle 411 and the further nozzle 412 are fixed to the internal face 406b of the supporting element 6. On the opposite external face 406a of the latter a supplying hole 419 is provided that is flowingly connected to an internal conduit 411a of the nozzle 11 and a further supplying hole 420 is provided that is flowingly connected to a respective internal conduit 412a of the further nozzle 412. The further supplying hole 420 is arranged for engaging with a needle 71 of the injecting device 61 of the dispensing machine 60, whereas the supplying hole 420 is arranged for engaging with a further needle 72 of the injecting device 61.

A blind hole 421 is provided on the external face 406a for abutting on and closing a remaining further needle 73 of the injecting device 61.

A vent hole 422 is provided on the supporting element 406 to permit the necessary venting during the operating step F1 of the air contained in the capsule 401 that is sealed together with the initial product P4. The vent hole 422 is arranged for engaging with another further needle 74 of the injecting device 61.

Optionally, during the second operating step F2, the nozzle 411 and/or the further nozzle 412 can continue delivering the fluid L to obtain further beverage B4 to be dispensed into the consumption receptacle 50.

By further crushing the capsule 401 and thus reducing the volume of the latter and thus of the cavity 405, all the beverage B4 is forced to exit the cavity 405.

The supporting element 406 comprises a body that has a substantially flat shape, for example a disc shape, and is provided with one or more openings 417, 418, for example two, for introducing the initial product P4 into the filtering element 30. A peripheral end edge thereof is fixed to the internal face 406b of the supporting element 6, at the two openings 417, 418.

Figure 15:
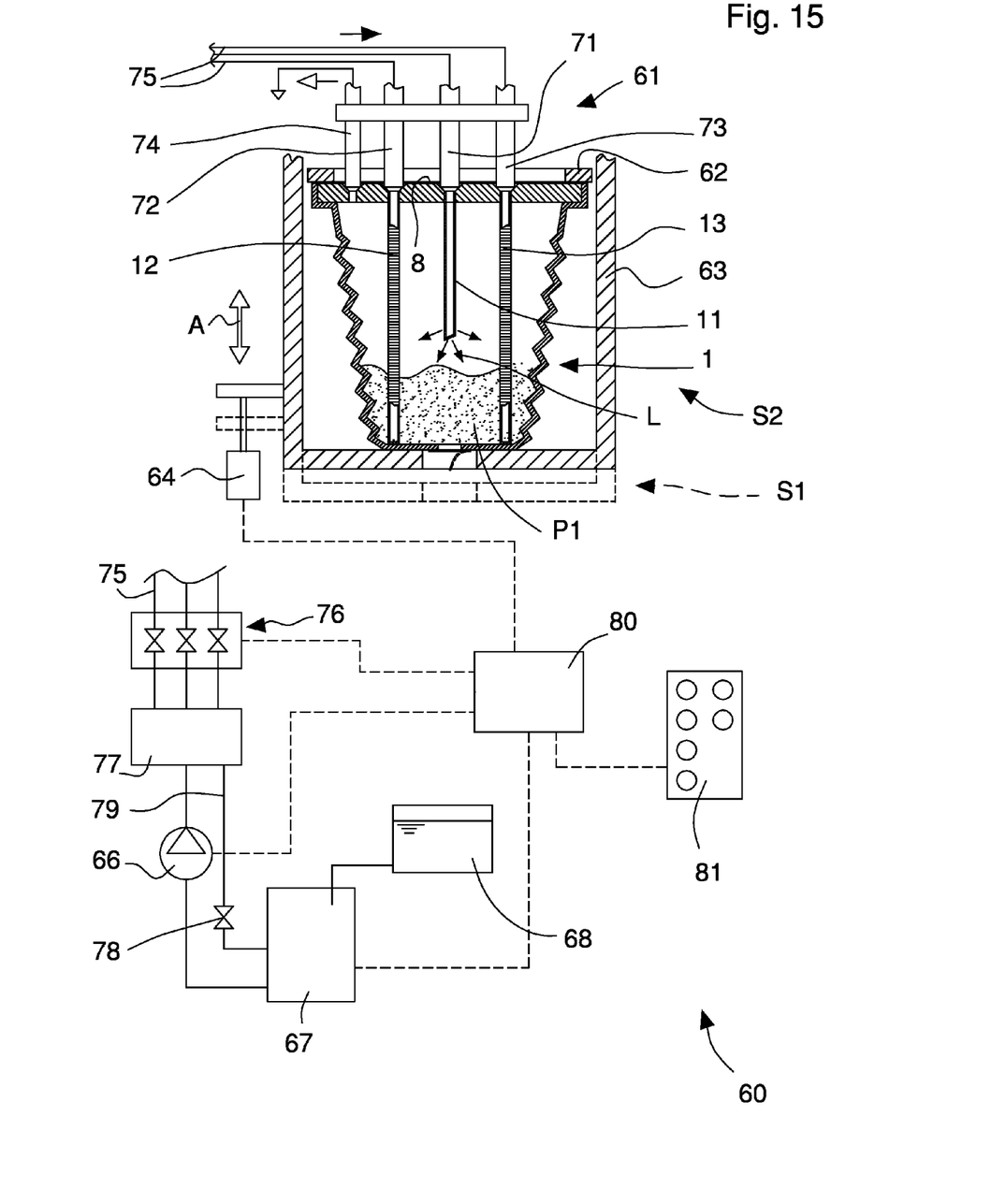
FIG. 15 is a schematic view of the dispensing machine.

With particular reference to FIG. 15, the dispensing machine 60 according to the invention arranged in particular for using the capsule for beverages disclosed above, comprises a positioning device 63 suitable for receiving and containing a capsule 1, 201, 301, 401 and is movable in both directions along the direction A, which is substantially vertical and orthogonal to the base wall of the capsule.

In an initial operating position S1, the positioning device 63—can receive capsules of different dimensions, for example the capsule 1 for products that are difficult to dissolve and/or dense of FIGS. 1 and 7 or the capsule 201 for easily soluble products in FIG. 9.

From the initial position S1, the positioning arrangement 63 is movable to an intermediate operating position S2 in which the upper part of the capsule 1 provided with covering element 8 abuts on an abutting element 62 and an injecting device 61 of the dispensing machine 60.

From the intermediate operating position S2, the positioning device is further movable along the direction A, upwards, to a final operating position S3 for progressively compressing and crushing the capsule 1 against the abutting element 62 and the injecting device 61 of the dispensing machine 60 in such a manner as to reduce the volume of the capsule, and thus of the cavity 5, and enable the cavity 5 to open and the beverage to exit.

The positioning device 63 is driven by a movement device 64, of known type and illustrated schematically in FIG. 15, controlled by a control unit 80 of the dispensing machine 60, with the methods disclosed below.

With reference also to the capsule in FIG. 7, the injecting device 61 includes a plurality of needles or similar elements 71, 72, 73 arranged for perforating the covering element 8 of the capsule 6 and being inserted and sealingly abutting on respective supplying holes 19, 20, 21 provided on the supporting element 6 underneath so as to deliver the fluid L into the cavity 5 through the nozzles 11, 12, 13. In particular, the injecting device 61 comprises a needle 71 and one or more further needles 72, 73, for example two.

The injecting device 61 further includes another needle 74 arranged for perforating the covering element 8 and being inserted and sealingly abutting on a vent hole 22 of the supporting element 6 in such a manner as to enable the air to exit the capsule 1.

The injecting device 61, as illustrated schematically in FIG. 15, is connected by respective conduits 75 and a valve element 76 to a manifold 77 supplied by a pump 66 with the pressurised fluid L, typically water or milk. The pump 66 is, for example, a volumetric piston pump with an adjustable stroke controlled by the control unit 80 that enables the pressure, the flow rate and the quantity of fluid L to be dispensed at each cycle into the capsule to be regulated with precision. The aforementioned parameters that depend on the type of capsule used in the machine 60 and on the initial product contained therein are stored in the control unit 80 of the dispensing machine 60.

The valve element 76 enables the passage and delivery pressure of the fluid to each of the needles of the injecting device 61 to be controlled.

In one embodiment of the dispensing machine that is not illustrated in the figures, a further pump is provided that supplies a further manifold to which the further nozzles 12, are connected. The pump and the further pump can respectively supply the nozzle 11 and the further nozzles 12, 13 with different fluid pressures and flow rates, in function of the type of capsule used.

The pump 66 draws the high-temperature fluid L from a boiler 67, which is also controlled by the control unit 80 to heat/maintain the fluid L at a desired consumption temperature. A tank 68 supplies the boiler 67 continuously.

The boiler 67 is further set up for supplying, via a further conduit 79, the manifold 77 directly and thus the injecting device 61 to inject into the capsule 1 the fluid in the form of steam. Further valve element 78 intercepts and regulates the flow of steam from the boiler 67 to the manifold 77.

The abutting element 62 substantially includes an annular plate that acts on the edge 7 of the casing 2 and on a peripheral portion of the supporting element 6. The plate 62 is fixed to a frame of the dispensing machine or to the injecting device 61.

The dispensing machine 60 further includes an interface 81 having, for example, a control panel by means of which the user not only switches the machine on and off by means of the "start" and "stop" buttons but may also select the type of capsule inserted into the machine, for example a capsule 1 having a first size (or height) and containing an initial product P1 that is difficult to dissolve to make a dense beverage (chocolate) (first type H1), a capsule 201 having a second size and containing an initial product P2 that is easily soluble (for example a herbal tea) (second type H2), a capsule 301 of a third size (which may coincide with the first size) containing a filtering element 30 and an initial product P3 for infusion (for example tea) (third type H3), a capsule 401 of a fourth size (which may coincide with the first size or with the third size) containing a filtering element 30 and an initial product P4 for percolation (for example coffee) (fourth type H4), etc.

Operating parameters of the dispensing machine 60 are associated with each type H1, H2, H3, H4 of capsule that are set and stored in the control unit 80 and permit automatic operation. In particular, according to the size and/or type of capsule and/or of the initial product contained therein, the positioning device 63 is moved by a movement device 64 from the initial operating position S1 to a respective intermediate operating position S2 in which the upper part of the capsule abuts on the abutting element 62 and the injecting device 61, the latter perforating the covering element 8 and abutting on the supplying holes (and/or the blind holes).

In accordance with the properties of the initial product contained in the capsule and/or of the type of the latter (e.g. with or without filtering element), the control unit 80 also regulates the temperature of the fluid L exiting the boiler 67, the delivery pressure of the pump 66 and/or the dispensing pressure from the nozzle 11 and from the further nozzles, the quantity of hot and pressurised fluid L to be sent and the needle or the needles of the injecting device 61 to which to send the aforementioned fluid L (via the valve element 77).

Also in accordance with the initial product and/or of the type of the latter (e.g. with or without filtering element), the control unit 80 establishes the duration of the operating steps F1, F2 and the duration of an intermediate infusion or percolation step of the initial product. In the second operating step F2 the control unit 80 commands the movement device 64 that drives the positioning device 63 in the direction A from the intermediate operating position S2 to the final operating position S3 for progressively compressing and crushing the capsule 1, reducing the volume thereof, in order to open the capsule 1 and release the beverage obtained in the consumption receptacle 50. More precisely, in the final operating position S3 the capsule 1, has a reduced volume (final volume), compared with an initial volume, having been progressively compressed and crushed by the positioning device 63 against the injecting device 61.

In function of the initial product and/or of the dimensions and/or type of the capsule, the control unit 80 can further set dispensing the fluid L from the nozzle 11 also during the second operating step F2, in particular directly into the consumption receptacle 50 to dilute the beverage until the beverage is brought up to the desired concentration.

The invention claimed is:

1. A capsule, comprising
    (a) a deformable casing including a bottom base wall and a side wall defining a cavity that is open at the top and closed at the bottom by said bottom base wall and suitable for containing an initial product to obtain a final food product, said side wall being deformable and having one of an accordion and bellows shape to enable said casing to be compressed along a direction orthogonal to said bottom base wall;
    (b) a supporting element immovably fixed to an upper edge of said casing opposite said bottom base wall and facing said cavity; and
    (c) a nozzle fixed to said supporting element and arranged for delivering into said cavity a fluid interacting with said initial product to make said final product and for opening said bottom base wall and enabling said final product to exit when said casing is compressed and crushed.

2. A capsule as defined in claim 1, and further comprising a covering element fixed to one of said first edge and to an external face of said supporting element for hermetically closing said capsule, said covering element being perforable by an injecting device of a dispensing machine that is suitable for receiving said capsule.

3. A capsule as defined in claim 1, wherein said nozzle includes a stiff tubular element, provided with a pointed end for perforating said bottom base wall.

4. A capsule as defined in claim 1, and further comprising at least one further nozzle fixed to said supporting element and arranged for delivering said fluid into said cavity.

5. A capsule as defined in claim 4, wherein said at least one further nozzle is deformable in order to enable said casing to be compressed.

6. A capsule as defined in claim 4, wherein said further nozzle is arranged alongside said nozzle and configured to direct at least one jet of fluid towards said wall to create a vortical flow of fluid and initial product from said bottom base wall to said supporting element.

7. A capsule as defined in claim 6, wherein said nozzle is configured for directing at least one jet of fluid in the direction of said bottom base wall and substantially toward the centre of said vortical flow in order to push said initial product towards said bottom base wall and maintain said initial product on said bottom base wall.

8. A capsule as defined in claim 1, wherein said supporting element includes an internal face to which said nozzle is fixed and an opposite external face provided with a supplying hole that is flowingly connected to an internal conduit of said nozzle and is engageable by an injecting arrangement of a dispensing machine that is suitable for dispensing said fluid.

9. A capsule as defined in claim 8, and further comprising at least one further nozzle fixed to said supporting element and arranged for delivering said fluid into said cavity and wherein said further nozzle is fixed to said internal face of said supporting element, and a further supplying hole on said opposite external face that is flowingly connected to a further internal conduit of said further nozzle and is engageable by said injecting arrangement.

10. A capsule as defined in claim 1, and further comprising a filtering element fixed to said supporting element and defining in said cavity a first chamber containing said initial product, said nozzle delivering said fluid into a second chamber defined between said casing and said filtering element.

11. A capsule, comprising:
    (a) a deformable casing provided with a bottom base wall and with a side wall defining a cavity that is open at the top and closed at the bottom by said bottom base wall and suitable for containing an initial product to obtain a final food product, said side wall being deformable and having one of an accordion and bellows shape to enable said casing to be compressed or crushed along a direction that is transverse to said bottom base wall; and
    (b) a supporting element immovably fixed to an upper edge of said casing opposite said bottom base wall, facing said cavity and supporting a nozzle arranged for delivering a fluid into said cavity that is suitable for interacting with said initial product to make said final product, said bottom base wall containing an opening promoting device arranged for making an exit opening for said final product when said casing is compressed.

12. A capsule as defined in claim 11, wherein said opening promoting device includes an exit opening hermetically closed by a closing element that is fixed outside said bottom base wall and is detachable or tearable under the thrust of said final product.

13. A capsule as defined in claim 11, wherein said opening promoting device comprises at least one of a pre-incision line or a weakening portion made on said bottom base wall.

14. A capsule as defined in claim 11, and further comprising a covering element fixed to one of said first edge or to an external face of said supporting element for hermetically closing said capsule, said covering element being perforable by an injecting device of a dispensing machine that is suitable for receiving said capsule.

15. A capsule as defined in claim 11, and further comprising at least one further nozzle fixed to said supporting element and arranged for delivering said fluid into said cavity.

16. A capsule as defined in claim 15, wherein said at least one further nozzle is deformable and compressible such as to enable said casing to be compressed and crushed.

17. A capsule as defined in claim 15, wherein said further nozzle is placed alongside said nozzle and is configured to direct at least one jet of fluid towards said side wall in such a manner as to create a vortical flow of fluid and initial product from said bottom base wall to said supporting element.

18. A capsule as defined in claim 17, wherein said nozzle is configured to direct at least one jet of fluid in the direction of said bottom base wall and substantially to the center of said vortical flow in order to push said initial product towards said bottom base wall and maintain said initial product on said bottom base wall.

19. A capsule as defined in claim 11, wherein said supporting element comprises an internal face to which said nozzle is fixed and an opposite external face provided with a supply hole that is flowingly connected to an internal conduit of said nozzle and is engageable by an injecting device of a dispensing machine that is suitable for dispensing said fluid.

20. A capsule as defined in claim 11, and further comprising a filtering element fixed to said supporting element and defining in said cavity a first chamber containing said initial product, said nozzle delivering said fluid into a second chamber defined between said casing and said filtering element.

21. A capsule, comprising
    (a) a deformable casing including a base wall containing an exit opening and a side wall defining a cavity that is open and suitable for containing an initial product to obtain a final food product;
    (b) a supporting element fixed to a first edge of said casing opposite said base wall and facing said cavity;
    (c) a nozzle fixed to said supporting element and arranged for delivering into said cavity a fluid interacting with said initial product to make said final product and for creating an exit opening said base wall and enabling said final product to exit when said casing is compressed and crushed; and
    (d) a closing element which is fixed outside said base wall for hermetically closing said exit opening and which is perforable or detachable by said nozzle, said closing element including at least one pre-incision line or a weakening portion that is suitable for facilitating perforation of said base wall by said nozzle.

22. A capsule, comprising
    (a) a deformable casing provided with a base wall and with a side wall defining a cavity that is open and suitable for containing an initial product to obtain a final food product;
    (b) a supporting element fixed to a first edge of said casing opposite said base wall, facing said cavity and supporting a nozzle, said supporting element engageable by an injecting device of a dispensing machine that is suitable for dispensing a fluid, said nozzle being arranged for delivering said fluid into said cavity that is suitable for interacting with said initial product to make said final product; and
    (c) at least one further nozzle fixed to said supporting element and arranged for delivering said fluid into said cavity and wherein said further nozzle is fixed to an internal face of said supporting element and a further supply opening on an opposite external face hole that is flowingly connected to an internal conduit of said further nozzle and is engageable by said injecting arrangement, said base wall containing an opening promoting device arranged for making an exit opening for said final product when said casing is compressed.

23. A capsule, comprising
    (a) a casing provided with a base wall and with a side wall defining a cavity that is open and suitable for containing an initial product to obtain a final food product;
    (b) a supporting element fixed to a first edge of said casing facing said cavity and supporting a nozzle; and
    (c) at least one further nozzle configured to deliver into said cavity a fluid that is suitable for interacting with said initial product to make said final product, said further nozzle directing a jet of fluid towards said side wall in such a manner as to create a vortical flow of fluid and initial product from said base wall to said supporting element, and said nozzle directing a jet of fluid in the direction of said base wall and substantially to the center of said vortical flow in order to push said initial product towards said base wall and maintain said initial product on said base wall.

24. A capsule as defined in claim 23, wherein said further nozzle includes an end portion that is substantially adjacent to said side wall and to said base wall and is inserted inside said initial product.

25. A capsule as defined in claim 23, wherein said casing is deformable and compressible along a direction that is orthogonal to said base wall.

26. A capsule as defined in claim 25, wherein said side wall is deformable or compressible, in particular having one of an accordion or bellows shape, to enable said casing to be compressed or crushed along said direction.

27. A capsule as defined in claim 25, wherein said base wall comprises an opening promoting device arranged for making an opening for the exit of said final product when said casing is compressed or crushed or for interacting and cooperating with said nozzle to make an opening for the exit of said final product when said casing is compressed or crushed.

28. A capsule as defined in claim 25, wherein said nozzle is arranged for opening said base wall and enabling said final product to exit when said casing is compressed or crushed.

29. A capsule as defined in to claim 25, wherein said at least one further nozzle is deformable or compressible such as to enable said casing to be compressed and/or crushed.

30. A capsule as defined in claim 23, and further comprising a covering element fixed to said first edge or to an external face of said supporting element for hermetically closing said capsule, said covering element being perforable by an injecting device of said fluid dispensing machine that is suitable for receiving said capsule.

31. A capsule as defined in claim 23, wherein said supporting element comprises an internal face to which said nozzle and said further nozzle are fixed and an opposite external face containing a supplying hole and containing a further supplying hole that is flowingly connected to respective internal conduits of said nozzle and said further nozzle, said supplying hole and said further supplying hole being engaged by an injecting device of said fluid dispensing machine that is suitable for receiving said capsule.

32. A dispensing machine for producing a final food product from a compressible and crushable capsule containing an initial product, comprising an injecting device arranged for perforating a covering element of said capsule and injecting into the latter a fluid interacting with said initial product to make a final food product, a positioning device that for housing said capsule and movable along a direction between an initial operating position wherein said capsule is insertible into said positioning device and an intermediate operating position wherein said capsule abuts on at least said injecting device that perforates said covering element to inject said liquid, and a final operating position wherein said capsule has a reduced volume as it has progressively been compressed and crushed by said positioning arrangement against said injecting arrangement such as to be opened and to enable said final product to exit, and a control unit for setting said intermediate operating position of said positioning device according to the size of said capsule.

33. A machine as defined in claim 32, wherein said positioning device is maintained in said intermediate operating position in a first operating step during which said injecting arrangement injects said liquid inside said capsule, said first operating step having a duration that is set by a control unit of said machine according to the size of said capsule or the properties of said initial product.

34. A machine as defined in claim 33, wherein said positioning device is driven by a movement device from said intermediate operating position to said final operating position to crush said capsule and reduce a volume thereof in a second operating step that is subsequent to said first operating step.

35. A machine as defined in claim 34, wherein between said first operating step and said second operating step there is an intermediate step of infusion or of percolation of said initial product, said intermediate step having a duration that is set by a control unit of said machine according to the size of said capsule or the properties of said initial product.

36. A machine as defined in claim 34, wherein during said second operating step said injecting arrangement injects said liquid inside said capsule or into a consumption receptacle.

37. A machine as defined in claim 32, wherein said positioning device is configured for receiving a capsule comprising a casing having a cavity for said initial product and a supporting element fixed to said casing and supporting a nozzle arranged for delivering said fluid (L) into said cavity, said supporting element comprising a supply hole that is flowingly connected to said nozzle, wherein said injecting device, in at least said intermediate operating position, is arranged for perforating said covering element and engaging said supply hole.

38. A machine as defined in claim 32, wherein said injecting arrangement is flowingly connected via a conduit and a valve device to a manifold supplied by a pump that draws said fluid from a boils.

39. A machine as defined in claim 32, and further comprising a control unit for regulating the temperature, pressure and quantity of fluid to be injected into said capsule according to the size of the capsule or the properties of the initial product contained therein.

40. A machine as defined in claim 39, wherein said injecting arrangement is flowingly connected via a conduit and a valve device to a manifold supplied by a pump that draws said fluid from a boiler and wherein said valve device, said pump and said boiler are connected and controlled by said control unit.

41. A machine as defined in claim 39, and further comprising an interface connected to said control unit enabling a user to select a type of capsule inserted into said machine, with each type of capsule there being associated a size of capsule or an initial product contained therein, in order to set operating parameters of said machine.

* * * * *